United States Patent
Lin et al.

(10) Patent No.: US 10,214,641 B2
(45) Date of Patent: Feb. 26, 2019

(54) AQUEOUS ORGANIC SILICON FLUORO-CONTAINING POLYMER DISPERSION AND METHOD FOR MANUFACTURING THE SAME

(71) Applicant: GRAND TEK ADVANCE MATERIAL SCIENCE CO., LTD., Taipei (TW)

(72) Inventors: Hsueh-Tso Lin, Hsinchu (TW); Dick Zhong, Arcadia, CA (US)

(73) Assignee: GRAND TEK ADVANCE MATERIAL SCIENCE CO., LTD., Taipei (TW)

(*) Notice: Subject to any disclaimer, the term of this patent is extended or adjusted under 35 U.S.C. 154(b) by 163 days.

(21) Appl. No.: 15/053,639

(22) Filed: Feb. 25, 2016

(65) Prior Publication Data

US 2016/0376459 A1    Dec. 29, 2016

(30) Foreign Application Priority Data

Jun. 25, 2015 (TW) .............................. 104120473 A

(51) Int. Cl.
  *C08L 27/16*    (2006.01)
  *C08K 5/541*    (2006.01)
  *C09D 127/16*   (2006.01)

(52) U.S. Cl.
  CPC .................................... *C08L 27/16* (2013.01)

(58) Field of Classification Search
  CPC ........... C08L 27/12; C08L 27/16; C08F 20/68
  See application file for complete search history.

(56) References Cited

U.S. PATENT DOCUMENTS

2013/0059961 A1* 3/2013 Arcella ................. C09C 1/3063
                                                            524/263
2014/0005298 A1* 1/2014 Thewes .................. C09D 5/185
                                                            523/179

* cited by examiner

*Primary Examiner* — Jessica M Roswell
(74) *Attorney, Agent, or Firm* — Muncy, Geissler, Olds & Lowe, P.C.

(57) ABSTRACT

An aqueous organic silicon fluoro-containing polymer dispersion is provided. The dispersion includes 100 parts by weight of poly(vinylidene difluoride-hexafluoropropylene), 10 to 30 parts by weight of organic silicon emulsion, and acrylate polymer. The acrylate polymer and the sum of the poly(vinylidene difluoride-hexafluoropropylene) and the organic silicon emulsion have a weight ratio of 30:100 to 50:100.

10 Claims, No Drawings

AQUEOUS ORGANIC SILICON FLUORO-CONTAINING POLYMER DISPERSION AND METHOD FOR MANUFACTURING THE SAME

CROSS REFERENCE TO RELATED APPLICATIONS

This application claims priority of Taiwan Patent Application No. 104120473, filed on Jun. 25, 2015, the entirety of which is incorporated by reference herein.

BACKGROUND

Technical Field

The disclosure relates to a fluoropolymer dispersion, and in particular it relates to an aqueous organic silicon fluoro-containing polymer dispersion and a method for manufacturing the same.

Description of the Related Art

Recently, the demands on architectural coatings are continuously increasing with a huge potential for development. Poly(vinylidene difluoride) (PVDF) resin coating is widely applied as an architectural coating due to its extraordinary climate resistance, anti-fouling properties, chemical resistance, and the like. However, PVDF must be dispersed in an organic solvent, which violates environmentally friendly manufacturing practices. In addition, the coating PVDF should be dried by high-temperature baking, rather than being air-dried, thereby limiting its application to just a few fields. The vinylidene difluoride (VDF) monomer can be copolymerized with other fluoro-containing monomers (e.g. hexafluoropropylene, HFP), to improve the properties of PVDF. The copolymer of VDF and HFP (P(VDF-HFP)) can be applied in an aqueous coating. However, the properties of the copolymer P(VDF-HFP) can be improved even further.

Accordingly, introducing another polymer into the P(VDF-HFP) to form a composite material with better functions is called for.

BRIEF SUMMARY

One embodiment of the disclosure provides an aqueous organic silicon fluoro-containing polymer dispersion, comprising: 100 parts by weight of a poly(vinylidene difluoride-hexafluoropropylene); 10 to 30 parts by weight of an organic silicon emulsion; and an acrylate polymer, wherein the acrylate polymer and the sum of the poly(vinylidene difluoride-hexafluoropropylene) and the organic silicon emulsion have a weight ratio of 30:100 to 50:100.

One embodiment of the disclosure provides a method of manufacturing an aqueous organic silicon fluoro-containing polymer dispersion, comprising: (1) evenly mixing 100 parts by weight of a poly(vinylidene difluoride-hexafluoropropylene), 10 to 30 parts by weight of an organic silicon emulsion, 0.3 to 0.9 parts by weight of an emulsifier, and 0.02 to 0.12 parts by weight of a pH buffer in a reactor; (2) adding 0.06 to 0.1 parts by weight of an initiator and 4 wt % to 7 wt % of an acrylate monomer into the reactor; (3) mixing 0.3 to 0.9 parts by weight of the emulsifier, 0.02 to 0.12 parts by weight of the pH buffer, 93 wt % to 96 wt % of the acrylate monomer, and water to prepare a pre-emulsion, wherein the acrylate monomer and the sum of the poly(vinylidene difluoride-hexafluoropropylene) and the organic silicon emulsion have a weight ratio of 30:100 to 50:100; (4) dropwisely adding 40 wt % to 50 wt % of the pre-emulsion into the reactor at room temperature to be stirred and reacted with the mixture in the reactor, and heating the reaction to 60° C. to 70° C. to be maintained at 60° C. to 70° C. for 0.5 to 1 hour; and (5) dropwisely adding the remaining pre-emulsion into the reaction at 60° C. to 70° C. in 30 to 90 minutes, heating the reaction to 75° C. to 80° C. to be maintained at 75° C. to 80° C. for 0.5 to 1 hour, cooling the reaction to 60° C. to 70° C., adding 0.1 to 0.2 parts by weight of a terminator, maintaining the temperature of the reactor for 1 to 2.5 hours, and cooling the reaction to be filtered for collecting the filtrate, wherein the filtrate is the aqueous organic silicon fluoro-containing polymer dispersion.

A detailed description is given in the following embodiments.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

One embodiment provides an aqueous organic silicon fluoro-containing polymer dispersion, which includes 100 parts by weight of poly(vinylidene difluoride-hexafluoropropylene) (abbreviate as P(VDF-HFP)). Compared to the homopolymer of vinylidene difluoride (PVDF), the P(VDF-HFP) has a lower crystallinity, a lower glass transition temperature (Tg), and a higher solvent swelling ratio. In one embodiment, the poly(VDF-HFP) has a HFP content of 20 wt % to 50 wt %. An overly high ratio of the HFP content may overly soften the product film. The product with an overly low ratio of the HFP cannot be air-dried.

The aqueous organic silicon fluoro-containing polymer dispersion also includes 10 to 30 parts by weight of an organic silicon emulsion. An overly high ratio of the organic silicon emulsion easily forms gelling particles during the reaction. The dispersion cannot achieve the desired properties due to an overly low ratio of organic emulsion. In one embodiment, the organic silicon emulsion is methylphenyl organic silicon resin emulsion, which simultaneously has methyl siloxy bondings and phenyl siloxy bondings. Compared to methyl organic silicon resin, the methylphenyl organic silicon resin is obviously better in terms of thermal flexibility, mechanical properties, adherence, and brightness due to the phenyl siloxy bondings. The organic silicon emulsion may improve brightness, acid resistance, and crack resistance of the dispersion.

The aqueous organic silicon fluoro-containing polymer dispersion also includes acrylate polymer, and the acrylate polymer and the sum of the poly(vinylidene difluoride-hexafluoropropylene) and the organic silicon emulsion have a weight ratio of 30:100 to 50:100. An overly low ratio of the acrylate polymer easily breaks the emulsion due to an unstable reaction, and the reaction result is easily separated into layers. An overly high ratio of the acrylate polymer may negatively influence the climate resistance and the washability of the aqueous organic silicon fluoro-containing polymer dispersion. A monomer of the acrylate polymer can be a suitable acrylic acid, methacrylic acid, or another polymerizable monomer. The monomer includes but is not limited to (1) methyl methacrylate (MMA) and (2) ethyl acrylate (EA), butyl acrylate (BA), butyl methacrylate (BMA), 2-ethylhexyl acrylate (2-EHA), hydroxypropyl acrylate (HPA), hydroxyethyl acrylate (HEA), hydroxyethyl methacrylate (HEMA), or a combination thereof. In one embodiment, the monomer is a mixture of MMA and EA, or a mixture of MMA, EA, and HEMA.

In one embodiment, the monomer of the acrylate polymer may further include 1 to 10 parts by weight of a functional monomer, which includes but is not limited to methacrylic acid (MAA), N-(hydroxymethyl)acrylamide (NMA), acrylic acid (AA), acrylamide (AM), glycidyl methacrylate (GMA), organic silicon functional monomer such as vinyl trimethoxy silane, methyl vinyl dimethoxy silane, vinyl triethoxy silane, (3-methacryloxy)propyl triethoxy silane, (methacryloxymethyl)methyl dimethoxy silane, methacryloxymethyl trimethoxy silane, diacetoneacrylamide (DAAM), Isobornyl acrylate (IBOA), or a combination thereof. The functional monomer may enhance the adherence between the dispersion and a substrate, increase the crosslinking density of the resin during film formation, and increase the water resistance, brightness, flexibility, and toughness of the resin. The reaction is easily gelled to form a resin being easily brittle with poor water resistance and low climate resistance due to an overly high ratio of the functional monomer.

In one embodiment, the aqueous organic silicon fluoro-containing polymer dispersion can be manufactured as follows: (1) evenly mixing 100 parts by weight of the P(VDF-HFP), 10 to 30 parts by weight of the organic silicon emulsion, 0.3 to 0.9 parts by weight of an emulsifier, and 0.02 to 0.12 parts by weight of a pH buffer in a reactor. In one embodiment, the emulsifier can be cationic emulsifier, non-ionic emulsifier, reactive emulsifier, composite emulsifier, or a combination thereof. The cationic emulsifier can be sodium lauryl sulfonate (SLS). The composite emulsifier can be alkylphenol ether sulfosuccinate sodium salt such as emulsifier MS-1. The non-ionic emulsifier can be polyoxyethylene laurylether. The reactive emulsifier can be sodium 3-allyloxy-2-hydroxy-1-propanesulfonate such as commercially available COPS-1. An overly high amount of emulsifier in this step may cause an overly high polymerization rate (e.g. gelling), produce too many bubbles in the reaction to stabilize the emulsion, and obviously lower the physical and chemical resistance (e.g. water resistance) of the polymer film. An overly low amount of emulsifier may cause the emulsion have a poor stability, and cause the polymerization be easily gelled (such as hanging rubber, holding a shaft, and the like). In one embodiment, the pH buffer can be phosphate salt, carbonate salt, or a combination thereof. An overly high amount of pH buffer in this step may lower the reactivity of the acrylate monomer and the functional monomer, thereby reducing the physical and chemical properties (e.g. water resistance) of the polymer film. An overly low amount of pH buffer in this step cannot stabilize the reaction, causing the emulsion to be break easily during the reaction.

Subsequently, (2) adding 0.06 to 0.1 parts by weight of an initiator and 4 wt % to 7 wt % of an acrylate monomer into the reactor. In one embodiment, the initiator should be oil soluble and initiated at a low temperature. The water soluble initiator easily initiates the monomers in water phase, but has difficulty initiating the monomers that have swelled into the fluoro-containing and silicon-containing compounds so that an inter-penetrated network (IPN) or a semi-IPN of the polymer cannot be easily formed. Next, the fluoro-containing and silicon-containing compounds are very unstable at a high temperature, such as a temperature that is higher than 85° C., thereby easily breaking the emulsion to aggregate the solid in the emulsion. The initiator can be azobisisobutyronitrile (AIBN) or benzoyl peroxide (BPO). In one embodiment, the initiator is AIBN. An overly high amount of initiator results in an overly high reaction rate, thereby easily breaking the emulsion to gel. An overly low amount of initiator results in a low reaction rate. An overly high amount of acrylate monomer in this step may result in an unstable system, resulting in the dispersion being easily aggregated. An overly low amount of acrylate monomer cannot adequately dissolve the initiator.

Subsequently, a pre-emulsion is prepared by (3) mixing 0.3 to 0.9 parts by weight of the emulsifier, 0.02 to 0.12 parts by weight of the pH buffer, 93 wt % to 96 wt % of the acrylate monomer, and water. In one embodiment, the acrylate monomer in steps (2) and (3) and the sum of the poly(vinylidene difluoride-hexafluoropropylene) and the organic silicon emulsion have a weight ratio of 30:100 to 50:100.

Subsequently, (4) 40 wt % to 50 wt % of the pre-emulsion is dropwisely added into the reactor at room temperature to be stirred and reacted with the mixture in the reactor, and the reaction is heated to 60° C. to 70° C. and maintained at 60° C. to 70° C. for 0.5 to 1 hour. An overly high amount of pre-emulsion in this step may result in an overly high monomer concentration in the initial stage of the reaction, causing the reaction rate to be too fast to gel the reaction, and breaking the emulsion. An overly low amount of pre-emulsion in this step may result in a slow reaction rate that will elongate the reaction period. An overly high temperature or an overly long period of being maintained at 60° C. to 70° C. may easily break the emulsion and gel the reaction due to an overly fast reaction rate, thereby negatively influencing the mechanical stability of the emulsion and reducing the active radicals. The continuation of the reaction in this step and a reaction in the following step will be negatively influenced due to the reduced active radicals. An overly low temperature or an overly short period of being maintained at 60° C. to 70° C. may leave too much monomer to negatively influence the reaction in the following step.

Subsequently, (5) the remaining pre-emulsion is dropwisely added into the reaction at 60° C. to 70° C. in 30 to 90 minutes. An overly short addition period of the pre-emulsion results in an overly high monomer concentration and an overly fast reaction rate, thereby easily breaking the emulsion and gelling the reaction. An overly long addition period of the pre-emulsion results in an overly slow reaction rate. Thereafter, the reaction is heated to 75° C. to 80° C. and maintained at 75° C. to 80° C. for 0.5 to 1 hour. An overly high temperature or an overly long period of being maintained at 75° C. to 80° C. in this step may make an unstable emulsion that can easily be broken. An overly low temperature or an overly short period of being maintained at 75° C. to 80° C. in this step may leave too many monomers, causing the reaction conversion rate to be low. Subsequently, the reaction is cooled to 60° C. to 70° C., 0.1 to 0.2 parts by weight of a terminator is added to the reactor, the temperature of the reactor is maintained for 1 to 2.5 hours, and the reaction is cooled to be filtered for collecting the filtrate, wherein the filtrate is the aqueous organic silicon fluoro-containing polymer dispersion. An overly high temperature or an overly long period of being maintained at 60° C. to 70° C. in this step may create an unstable emulsion that can become broken easily. An overly low temperature or an overly short period of being maintained at 60° C. to 70° C. in this step may leave too much monomer, causing the reaction conversion rate to be low. In one embodiment, the terminator can be a water soluble terminator such as potassium peroxydisulfate (KPS), ammonium peroxydisulfate (APS), a oxidation-reduction serial terminator composed of tert-butyl hydroperoxide (t-PBH) and sodium formaldehyde sulfoxylate (SFS), or APS/FeSO$_4$. In one embodiment, the terminator is the oxidation-reduction serial terminator (t-PBH/SFS). An overly high amount of terminator makes an unstable emulsion that can be easily broken. An overly low amount of terminator may leave too much of the monomer, resulting in the reaction conversion rate being low.

In one embodiment, a further 1 to 10 parts by weigh of the functional monomer is added into the reactor in the step (2).

The aqueous organic silicon fluoro-containing polymer dispersion can be applied as an aqueous architectural coating, which has excellent brightness, anti-fouling properties, acid resistance, crack resistance, and washability.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

EXAMPLES

The P(VDF-HFP) copolymers were fluoro rubbers F2601 with a HFP content of 37 wt % and a solid content of 32%, F2611L with a HFP content of 20 wt % and a solid content of 28%, and F2631L with a HFP content of 50 wt % and a solid content of 30%, which were commercially available from Zhong Hao Chenguang Chemical Research Institute.

The organic silicon emulsions were aqueous methylphenyl organic silicon resin emulsion such as SILRES®MP 50 E with a solid content of 50% and SILRES®MPF 52 E with a solid content of 60% (commercially available from Wacker company), and SILIKOPHEN®P 40/W with a solid content of 50% (commercially available from German company Tego).

Example 1

3125 g of fluoro-containing polymer (F2601), 200 g of organic silicon emulsion (MP50E), 4 g of sodium lauryl sulfonate (SLS), and 1 g of sodium carbonate were added into a reactor and then evenly mixed. 0.8 g of AIBN, 20 g of methyl methacrylate (MMA), 8 g of ethyl acrylate (EA), and 10 g of methacrylic acid (MAA) were added into the stirred mixture in the reactor.

4 g of SLS, 1 g of sodium carbonate, 260 g of MMA, 112 g of EA, and an appropriate amount of water were mixed to prepare a pre-emulsion in another vessel. 40 wt % of the pre-emulsion was dropwisely added into the stirred mixture at room temperature in the reactor. The mixture in the reactor was then heated to 60° C. and maintained at 60° C. for 1 hour. The remaining pre-emulsion was then dropwisely added into the reactor in 30 minutes, and the reaction in the reactor was then heated to 75° C. and maintained at 75° C. to react for 60 minutes. The reaction was then cooled to 60° C., 1 g of terminator (t-BPH/SFS) was then added to the reaction, and the terminated reaction was maintained at 60° C. for 1 hour. The reaction result was cooled to room temperature to be filtered to collect the filtrate, and the filtrate was an aqueous organic silicon fluoro-containing polymer dispersion.

Example 2

3125 g of fluoro-containing polymer (F2601), 400 g of organic silicon emulsion (P 40/W), 6 g of SLS, and 1 g of sodium carbonate were added into a reactor and then evenly mixed. 0.7 g of AIBN, 10 g of MMA, 8 g of EA, and 1 g of acrylamide (AM) were added into the stirred mixture in the reactor.

6 g of SLS, 1 g of sodium carbonate, 190 g of MMA, 152 g of EA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 70° C. and maintained at 70° C. for 0.5 hour. The remaining pre-emulsion was then dropwisely added into the reactor for 60 minutes, and the reaction in the reactor was then heated to 80° C. and maintained at 80° C. to react for 30 minutes. The reaction was then cooled to 70° C., 1 g of terminator (t-BPH/SFS) was then added to the reaction, and the terminated reaction was maintained at 70° C. for 2.5 hours. The reaction result was cooled to room temperature to be filtered to collect the filtrate, and the filtrate was an aqueous organic silicon fluoro-containing polymer dispersion.

Example 3

3571.4 g of fluoro-containing polymer (F2611L), 500 g of organic silicon emulsion (MPF 52 E), 5 g of SLS, and 1 g of sodium carbonate were added into a reactor and then evenly mixed. 0.8 g of AIBN, 18 g of MMA, 6 g of EA, 5 g of MAA, and 5 g of AM were added into the stirred mixture in the reactor.

5 g of SLS, 1 g of sodium carbonate, 282 g of MMA, 114 g of EA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 60° C. and maintained at 60° C. for 1 hour. The remaining pre-emulsion was then dropwisely added into the reactor in 90 minutes, and the reaction in the reactor was then heated to 75° C. and maintained at 75° C. to react for 60 minutes. The reaction was then cooled to 60° C., 1 g of terminator (t-BPH/SFS) was then added to the reaction, and the terminated reaction was maintained at 60° C. for 2.5 hours. The reaction result was cooled to room temperature to be filtered to collect the filtrate, and the filtrate was an aqueous organic silicon fluoro-containing polymer dispersion.

Example 4

3333.3 g of fluoro-containing polymer (F2631L), 300 g of organic silicon emulsion (MPF 52 E), 6 g of SLS, and 1 g of sodium carbonate were added into a reactor and then evenly mixed. 1 g of AIBN, 12 g of MMA, and 8 g of EA were added into the stirred mixture in the reactor.

6 g of SLS, 1 g of sodium carbonate, 288 g of MMA, 192 g of EA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 70° C. and maintained at 70° C. for 0.5 hour. The remaining pre-emulsion was then dropwisely added into the reactor in 60 minutes, and the reaction in the reactor was then heated to 80° C. and maintained at 80° C. to react for 30 minutes. The reaction was then cooled to 70° C., 1 g of terminator (t-BPH/SFS) was then added to the reaction, and the terminated reaction was maintained at 70° C. for 1.5 hours. The reaction result was cooled to room temperature to be filtered to collect the filtrate, and the filtrate was an aqueous organic silicon fluoro-containing polymer dispersion.

Example 5

3125 g of fluoro-containing polymer (F2601), 400 g of organic silicon emulsion (MPF 52 E), 8 g of SLS, and 1 g of sodium carbonate were added into a reactor and then evenly mixed. 1.2 g of AIBN, 26 g of MMA, 14 g of EA, 5 g of MAA, and 5 g of AM were added into the stirred mixture in the reactor.

8 g of SLS, 1 g of sodium carbonate, 374 g of MMA, 206 g of EA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 70° C. and maintained at 70° C. for 1 hour. The remaining pre-emulsion was then dropwisely added into the reactor in 60 minutes, and the reaction in the reactor was then heated to 80° C. and maintained at 80° C. to react for 40 minutes. The reaction was then cooled to 70° C., 1 g of terminator (t-BPH/SFS) was then added to the reaction, and the terminated reaction was maintained at 70° C. for 1 hour. The reaction result was cooled to room temperature to be filtered to collect the filtrate, and the filtrate was an aqueous organic silicon fluoro-containing polymer dispersion.

Example 6

3125 g of fluoro-containing polymer (F2601), 400 g of organic silicon emulsion (MPF 52 E), 8 g of SLS, and 1 g of sodium carbonate were added into a reactor and then evenly mixed. 1.2 g of AIBN, 24 g of MMA, 13 g of EA, 4 g of HEMA, 5 g of MAA, and 5 g of AM were added into the stirred mixture in the reactor.

8 g of SLS, 1 g of sodium carbonate, 336 g of MMA, 187 g of EA, 56 g of HEMA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 70° C. and maintained at 70° C. for 1 hour. The remaining pre-emulsion was then dropwisely added into the reactor in 60 minutes, and the reaction in the reactor was then heated to 80° C. and maintained at 80° C. to react for 40 minutes. The reaction was then cooled to 70° C., 1 g of terminator (t-BPH/SFS) was then added to the reaction, and the terminated reaction was maintained at 70° C. for 1 hour. The reaction result was cooled to room temperature to be filtered to collect the filtrate, and the filtrate was an aqueous organic silicon fluoro-containing polymer dispersion.

Comparative Example 1

3125 g of fluoro-containing polymer (F2601), 8 g of SLS, and 1 g of sodium carbonate were added into a reactor and then evenly mixed. 1.2 g of AIBN, 26 g of MMA, 14 g of EA, 5 g of MAA, and 5 g of AM were added into the stirred mixture in the reactor.

8 g of SLS, 1 g of sodium carbonate, 374 g of MMA, 206 g of EA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 70° C. and maintained at 70° C. for 1 hour. The remaining pre-emulsion was then dropwisely added into the reactor in 60 minutes, and the reaction in the reactor was then heated to 80° C. and maintained at 80° C. to react for 40 minutes. The reaction was then cooled to 70° C., 1 g of terminator (t-BPH/SFS) was then added to the reaction, and the terminated reaction was maintained at 70° C. for 1 hour. The reaction result was cooled to room temperature to be filtered to collect the filtrate, and the filtrate was an aqueous organic silicon fluoro-containing polymer dispersion.

Comparative Example 2

3125 g of fluoro-containing polymer (F2601), 600 g of organic silicon emulsion (MPF 52 E), 8 g of SLS, and 1 g of sodium carbonate were added into a reactor and then evenly mixed. 1.2 g of AIBN, 26 g of MMA, 14 g of EA, 5 g of MAA, and 5 g of AM were added into the stirred mixture in the reactor.

8 g of SLS, 1 g of sodium carbonate, 374 g of MMA, 206 g of EA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 70° C. and maintained at 70° C. for 1 hour. Gelled particles were appeared in the reaction.

Comparative Example 3 (The Acrylate Polymer and the Sum of the P(VDF-HFP) Copolymer and the Organic Silicon Emulsion had a Weight Ratio of 29:100)

3125 g of fluoro-containing polymer (F2601), 400 g of organic silicon emulsion (MPF 52 E), 8 g of SLS, and 1 g of sodium carbonate were added into a reactor and then evenly mixed. 0.7 g of AIBN, 10 g of MMA, 8 g of EA, 5 g of MAA, and 5 g of AM were added into the stirred mixture in the reactor.

8 g of SLS, 1 g of sodium carbonate, 190 g of MMA, 152 g of EA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 70° C. and maintained at 70° C. for 1 hour. Gelled particles were appeared or the emulsion was broken in the reaction.

Comparative Example 4 (The Acrylate Polymer and the Sum of the P(VDF-HFP) Copolymer and the Organic Silicon Emulsion had a Weight Ratio of 51.6:100)

3125 g of fluoro-containing polymer (F2601), 400 g of organic silicon emulsion (MPF 52 E), 8 g of SLS, and 1 g of sodium carbonate were added into a reactor and then evenly mixed. 1.3 g of AIBN, 26 g of MMA, 14 g of EA, 5 g of MAA, and 5 g of AM were added into the stirred mixture in the reactor.

8 g of SLS, 1 g of sodium carbonate, 394 g of MMA, 206 g of EA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 70° C. and maintained at 70° C. for 1 hour. The remaining pre-emulsion was then dropwisely added into the reactor in 60 minutes, and the reaction in the reactor was then heated to 80° C. and maintained at 80° C.

to react for 40 minutes. The reaction was then cooled to 70° C., 1 g of terminator (t-BPH/SFS) was then added to the reaction, and the terminated reaction was maintained at 70° C. for 1 hour. The reaction result was cooled to room temperature to be filtered to collect the filtrate, and the filtrate was an aqueous organic silicon fluoro-containing polymer dispersion.

Comparative Example 5

The raw material amounts in Comparative Example 5 are the same as those in Example 3. 5 g of SLS and 1 g of sodium carbonate were added to the reactor to be evenly mixed. 0.8 g of AIBN, 18 g of MMA, 6 g of EA, 5 g of MAA, and 5 g of AM were added into the stirred mixture in the reactor.

5 g of SLS, 1 g of sodium carbonate, 282 g of MMA, 114 g of EA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 60° C. and maintained at 60° C. for 1 hour. The remaining pre-emulsion was then dropwisely added into the reactor in 90 minutes, and the reaction in the reactor was then heated to 75° C. and maintained at 75° C. to react for 60 minutes. The reaction was then cooled to 60° C., 1 g of terminator (t-BPH/SFS) was then added to the reaction, and the terminated reaction was maintained at 60° C. for 2.5 hours. The reaction result was cooled to room temperature to be filtered to collect the filtrate. 3571.4 g of the fluoro-containing polymer (F2611L), 500 g of the organic silicon emulsion (MPF 52 E) were added to the filtrate to be evenly mixed to form a dispersion. The dispersion cannot be used to prepare a finishing coating due to aggregation.

Comparative Example 6

3571.4 g of fluoro-containing polymer (F2611L), 8 g of SLS, and 1 g of sodium carbonate were added into a reactor and then evenly mixed. 1.2 g of AIBN, 26 g of MMA, 14 g of EA, 5 g of MAA, and 5 g of AM were added into the stirred mixture in the reactor.

8 g of SLS, 1 g of sodium carbonate, 374 g of MMA, 206 g of EA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 70° C. and maintained at 70° C. for 1 hour. The remaining pre-emulsion was then dropwisely added into the reactor in 60 minutes, and the reaction in the reactor was then heated to 80° C. and maintained at 80° C. to react for 40 minutes. The reaction was then cooled to 70° C., 1 g of terminator (t-BPH/SFS) was then added to the reaction, and the terminated reaction was maintained at 70° C. for 1 hour. The reaction result was cooled to room temperature to be filtered to collect the filtrate, and the filtrate was an aqueous organic silicon fluoro-containing polymer dispersion.

TABLE 1

| (Formulae of Examples 1-6 and Comparative Examples 1-6) | | | | | | | |
|---|---|---|---|---|---|---|---|
| | | Example 1 | Example 2 | Example 3 | Example 4 | Example 5 | Example 6 |
| P(VDF-HFP),g | F2601 (solid content of 32%) | 3125 | 3125 | / | / | 3125 | 3125 |
| | F2611L (solid content of 28%) | / | / | 3571.4 | / | / | / |
| | F2631L (solid content of 30%) | / | / | / | 3333.3 | / | / |
| Organic silicon emulsion (g) | MP 50 E (solid content of 50%) | 200 | / | / | / | / | / |
| | MPF 52 E (solid content of 60%) | / | / | 500 | 300 | 400 | 400 |
| | P 40/W (solid content of 50%) | / | 400 | / | / | / | / |
| Acrylate monomer (g) | MMA | 280 | 200 | 300 | 300 | 400 | 360 |
| | EA | 120 | 160 | 120 | 200 | 220 | 200 |
| | HEMA | / | / | / | / | / | 60 |
| Functional monomer (g) | MAA | 10 | / | 5 | / | 5 | 5 |
| | AM | / | 1 | 5 | / | 5 | 5 |

TABLE 1-continued (Formulae of Examples 1-6 and Comparative Examples 1-6)

| | | | | | | |
|---|---|---|---|---|---|---|
| SLS (g) | 8 | 12 | 10 | 12 | 16 | 16 |
| Sodium carbonate (g) | 2 | 2 | 2 | 2 | 2 | 2 |
| AIBN (g) | 0.8 | 0.7 | 0.8 | 1 | 1.2 | 1.2 |
| Terminator (t-BPH/SFS), g | 1 | 1 | 1 | 1 | 1 | 1 |

| | | Comparative Example 1 | Comparative Example 2 | Comparative Example 3 | Comparative Example 4 | Comparative Example 5 | Comparative Example 6 |
|---|---|---|---|---|---|---|---|
| P(VDF-HFP), g | F2601 (solid content of 32%) | 3125 | 3125 | 3125 | 3125 | / | / |
| | F2611L (solid content of 28%) | / | / | / | / | 3571.4 | 3571.4 |
| | F2631L (solid content of 30%) | / | / | / | / | / | / |
| Organic silicon emulsion (g) | MP 50 E (solid content of 50%) | / | / | / | / | / | / |
| | MPF 52 E (solid content of 60%) | / | 600 | 400 | 400 | 500 | / |
| | P 40/W (solid content of 50%) | / | / | / | / | / | / |
| Acrylate monomer (g) | MMA | 400 | 400 | 200 | 420 | 300 | 400 |
| | EA | 220 | 220 | 160 | 220 | 120 | 220 |
| Functional monomer (g) | MAA | 5 | 5 | 5 | 5 | 5 | 5 |
| | AM | 5 | 5 | 5 | 5 | 5 | 5 |
| SLS (g) | | 16 | 16 | 16 | 16 | 10 | 16 |
| Sodium carbonate (g) | | 2 | 2 | 2 | 2 | 2 | 2 |
| AIBN (g) | | 1.2 | 1.2 | 0.7 | 1.3 | 0.8 | 1.2 |
| Terminator (t-BPH/SFS), g | | 1 | 1 | 1 | 1 | 1 | 1 |

The following compositions were grinded to a size of less than 10 μm to prepare an abrasive.

TABLE 2

(Abrasive Formula)

| Abrasive composition | Composition weight (g) |
|---|---|
| Water | 30 |
| Cellulose (2.5%) | 140 |
| pH adjuster | 5 |
| Dispersant | 6 |
| Wetting agent | 4 |
| defoamer | 2 |
| Propylene glycol | 20 |
| Titanium white powder | 215 |
| Sericite powder | 15 |
| Quartz powder | 10 |
| Kaolin clay (2000 meshes) | 10 |
| Preservative | 1 |
| Total | 458 |

The dispersions in Examples 1-6 and Comparative Examples 1, 4, and 6 were selected to prepare a finishing coating by the following formula.

TABLE 3

| (Formula of the finishing coating) | |
|---|---|
| Composition | Weight (g) |
| Dispersion (from one of Examples 1-6 and Comparative Examples 1, 4, and 6) | 570 |
| Acrylic acid emulsion | 30 |
| Abrasive (size less than 10 μm) | 458 |
| Defoamer | 2 |
| Alcohol ester-12 | 30 |
| PU type thickener | 4 |
| Leveling agent | 6 |
| Total | 1100 |

The acrylic acid emulsion in Table 3 was prepared by the following method.

| Raw materials amount (g) Feeding No. |
|---|
| Water 180.0 |
| NaHCO$_3$ 0.2 |
| SLS 1.0 ① |
| MS-1 2.0 |
| Reactive emulsifier 2.0 |
| |
| MMA 165.0 |
| BA 125.0 |
| EA 194.5 ② |
| MAA 6.0 |
| NMA 10.0 |
| Water 160.0 |
| NaHCO$_3$ 0.4 |
| Emulsifier MS-1 2.5 ③ |
| Non-ionic emulsifier 2.5 |
| Chain transfer agent 2.0 |
| Terminator: ammonium peroxydisulfate/water 1.0/10.0 ④ |
| Initiator: ammonium peroxydisulfate/water 3.0/30.0 ⑤ |
| Terminator: ammonium peroxydisulfate/water 1.0/10.0 ⑥ |

Process:

1. The reaction tank was vacuumed, and the vacuum was broken by nitrogen to remove oxygen in the reaction tank. Alternatively, a large amount of nitrogen was introduced directly into the reaction tank to remove oxygen in the reaction tank. The feeding No. ① was added into the reaction tank under nitrogen, stirred at high speed (250 rpm), and heated to 72□;
2. 25% of the feeding No. □ was added into the reaction tank to be continuously stirred;
3. 75% of the feeding No. ② was added into the feeding No. ③ and then stirred (250 rpm) to prepare a pre-emulsion emulsion;
4. After the reaction temperature was maintained at 72° C., the feeding No. ④ was then added into the reaction tank, and the stirring speed was then lowered to 120 rpm. The temperature of the reaction was sharply increased in 5 minutes, and the temperature in the reaction tank must be strictly controlled to be not higher than 82° C.;
5. The reaction in the reaction tank was maintained at 75° C. to 82° C. to react for 30 minutes. When the reaction temperature was constancy at about 78° C., the pre-emulsion prepared in step 3 and the feeding No. ⑤ were simultaneously dropwisely added into the reaction tank through different feed pipes in 3 to 3.5 hours;
6. The reaction temperature was maintained for 30 minutes, and the feeding No. ⑥ was then added into the reaction tank in 15 minutes; and
7. The reaction temperature was maintained at 78° C. to 82° C. to react for 1.5 hours, and the reaction result was then cooled to room temperature to be filtered by a filtering cloth of 400 meshes.

The following composition was grinded to a size of less than 10 μm to prepare an abrasive.

TABLE 4

| (Abrasive formula) | |
|---|---|
| Abrasive composition | Composition weight (g) |
| Water | 70 |
| Cellulose (2.5%) | 80 |
| pH adjuster | 5 |
| Dispersant | 6 |
| Wetting agent | 4 |
| Defoamer | 2 |
| Titanium white powder | 180 |
| Calcium carbonate | 130 |
| Talc powder | 100 |
| Total | 577 |

The Primer coating could be a regular primer coating, e.g. preparing a primer coating according to the following formula.

TABLE 5

| (Primer coating formula) | |
|---|---|
| Composition | Weight (g) |
| Styrene-acrylic emulsion VINNAPAS ® SAF 54 | 380 |
| Abrasive (size less than 10 μm) | 577 |
| Propylene glycol | 20 |
| Preservative | 1 |
| Defoamer | 2 |
| Alcohol ester-12 | 10 |
| PU type thickener | 4 |
| Leveling agent | 6 |
| Total | 1000 |

According to China national standard GB/T 9755-2001, a primer coating was coated as a wet film with a thickness of 100 μm and then dried for 6 hours. A finishing coating was then coated on the dried primer coating as a wet film with a thickness of 100 and then dried for 7 days for further testing. The properties of the samples were measured and are listed in Table 6.

TABLE 6

| (Coating properties) | | | | | | | | | |
|---|---|---|---|---|---|---|---|---|---|
| Properties | Example 1 | Example 2 | Example 3 | Example 4 | Example 5 | Example 6 | Comparative Example 1 | Comparative Example 4 | Comparative Example 6 |
| Brightness (60°) | 40° | 40° | 45° | 40° | 40° | 40° | / | / | / |
| Anti-fouling | 3.3% | 5.0% | 2.5% | 4.2% | 4.3% | 4.1% | / | / | / |

TABLE 6-continued (Coating properties)

| Properties | Example 1 | Example 2 | Example 3 | Example 4 | Example 5 | Example 6 | Comparative Example 1 | Comparative Example 4 | Comparative Example 6 |
|---|---|---|---|---|---|---|---|---|---|
| properties (contrast loss ratio) | | | | | | | | | |
| Acid resistance | 30 d | 30 d | 30 d | 30 d | 30 d | 30 d | / | / | / |
| Coating appearance | No crack | No crack | No crack | No crack | No crack | No crack | Slight crack | Small crack | Crack |
| Washability | 50000 | 90000 | 60000 | 80000 | 100000 | 100000 | / | / | / |

As shown in Table 6, the coating prepared from the dispersion in Examples 1-6 had brightness, anti-fouling properties, acid resistance, crack resistance, and washability. Compared to the Comparative Examples, the coating in the Examples had a higher crack resistance.

The above properties were measured according to the following standards.

Brightness: measured by a gloss meter REFO-60 MINI according to the China national standard GB/T 9754-2007.

Anti-fouling properties: measured according to the China national standard GB/T 9780-2005.

Acid resistance: measured according to the China national standard GB/T 9274-1988.

Coating appearance: observed by human eye.

Washability: measured according to the China national standard GB/T 9255-1988.

While the disclosure has been described by way of example and in terms of the embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An aqueous organic silicon fluoro-containing polymer dispersion, comprising:
   100 parts by weight of a poly(vinylidene difluoride-hexafluoropropylene);
   10 to 30 parts by weight of an organic silicon emulsion; and
   an acrylate polymer, wherein the acrylate polymer and the sum of the poly(vinylidene difluoride-hexafluoropropylene) and the organic silicon emulsion have a weight ratio of 30:100 to 50:100.

2. The aqueous organic silicon fluoro-containing polymer dispersion as claimed in claim 1, wherein the poly(vinylidene difluoride-hexafluoropropylene) has a hexafluoropropylene content of 20 wt % to 50 wt %.

3. The aqueous organic silicon fluoro-containing polymer dispersion as claimed in claim 1, wherein the organic silicon emulsion is methylphenyl organic silicon resin emulsion.

4. The aqueous organic silicon fluoro-containing polymer dispersion as claimed in claim 1, wherein the acrylate polymer is polymerized from a monomer mixture of (1) methyl methacrylate and (2) ethyl acrylate, butyl acrylate, butyl methacrylate, 2-ethylhexyl acrylate, hydroxypropyl acrylate, hydroxyethyl acrylate, hydroxyethyl methacrylate, or a combination thereof.

5. The aqueous organic silicon fluoro-containing polymer dispersion as claimed in claim 1, wherein the acrylate polymer is further polymerized from 1 to 10 parts by weight of functional monomer, and the functional monomer includes methacrylic acid, N-(hydroxymethyl)acrylamide, acrylic acid, acrylamide, glycidyl methacrylate, vinyl trimethoxy silane, methyl vinyl dimethoxy silane, vinyl triethoxy silane, (3-methacryloxy)propyl triethoxy silane, (methacryloxymethyl)methyl dimethoxy silane, methacryloxymethyl trimethoxy silane, diacetoneacrylamide, isobornyl acrylate, or a combination thereof.

6. A method of manufacturing an aqueous organic silicon fluoro-containing polymer dispersion, comprising:
   (1) evenly mixing 100 parts by weight of a poly(vinylidene difluoride-hexafluoropropylene), 10 to 30 parts by weight of an organic silicon emulsion, 0.3 to 0.9 parts by weight of an emulsifier, and 0.02 to 0.12 parts by weight of a pH buffer in a reactor;
   (2) adding 0.06 to 0.1 parts by weight of an initiator and 4 wt % to 7 wt % of an acrylate monomer into the reactor;
   (3) mixing 0.3 to 0.9 parts by weight of the emulsifier, 0.02 to 0.12 parts by weight of the pH buffer, 93 wt % to 96 wt % of the acrylate monomer, and water to prepare a pre-emulsion, wherein the acrylate monomer and the sum of the poly(vinylidene difluoride-hexafluoropropylene) and the organic silicon emulsion have a weight ratio of 30:100 to 50:100;
   (4) dropwisely adding 40 wt % to 50 wt % of the pre-emulsion into the reactor at room temperature to be stirred and reacted with the mixture in the reactor, and heating the reaction to 60° C. to 70° C. to be maintained at 60° C. to 70° C. for 0.5 to 1 hour; and
   (5) dropwisely adding the remaining pre-emulsion into the reaction at 60° C. to 70° C. in 30 to 90 minutes, heating the reaction to 75° C. to 80° C. to be maintained at 75° C. to 80° C. for 0.5 to 1 hour, cooling the reaction to 60° C. to 70° C., adding 0.1 to 0.2 parts by weight of a terminator, maintaining the temperature of the reactor for 1 to 2.5 hours, and cooling the reaction to be filtered for collecting the filtrate, wherein the filtrate is the aqueous organic silicon fluoro-containing polymer dispersion.

7. The method as claimed in claim 6, further adding 1 to 10 parts by weight of a functional monomer into the reactor in step (2).

8. The method as claimed in claim 6, wherein the acrylate monomer includes (1) methyl methacrylate and (2) ethyl acrylate, butyl acrylate, butyl methacrylate, 2-ethylhexyl acrylate, hydroxypropyl acrylate, hydroxyethyl acrylate, hydroxyethyl methacrylate, or a combination thereof.

9. The method as claimed in claim 6, wherein the poly(vinylidene difluoride-hexafluoropropylene) has a hexafluoropropylene content of 20 wt % to 50 wt %.

10. The method as claimed in claim 6, wherein the organic silicon emulsion is methylphenyl organic silicon resin emulsion.

\* \* \* \* \*